United States Patent [19]
Schorr et al.

[11] Patent Number: 5,659,610
[45] Date of Patent: Aug. 19, 1997

[54] BATTERY FEED CIRCUIT

[75] Inventors: Ian Andrew Schorr, Chicago, Ill.; Dewayne A. Spires, Plaistow, N.H.

[73] Assignee: Lucent Technologies Inc., Murray Hill, N.J.

[21] Appl. No.: 359,164

[22] Filed: Dec. 19, 1994

Related U.S. Application Data

[63] Continuation-in-part of Ser. No. 314,101, Sep. 28, 1994, Pat. No. 5,528,688.

[51] Int. Cl.$^6$ .......................... H04M 19/00; H04M 3/08
[52] U.S. Cl. .......................... 379/413; 379/395; 379/399; 379/324; 379/412; 379/26
[58] Field of Search .......................... 379/413, 412, 379/399, 404, 403, 402, 322, 324, 382, 405

[56] References Cited

U.S. PATENT DOCUMENTS

| | | | |
|---|---|---|---|
| 3,932,713 | 1/1976 | Fleuchaus et al. | 379/415 |
| 3,993,880 | 11/1976 | O'Neill | 379/413 X |
| 4,007,335 | 2/1977 | Hetherington et al. | 379/413 |
| 4,176,255 | 11/1979 | Rudisill, Jr. | 379/413 |
| 4,419,542 | 12/1983 | Embree et al. | 379/413 X |
| 4,476,350 | 10/1984 | Aull et al. | 379/382 |
| 4,554,412 | 11/1985 | Smith | 379/413 |
| 4,558,186 | 12/1985 | Stahl | 379/402 |
| 4,577,064 | 3/1986 | Huft et al. | 379/324 |
| 4,602,130 | 7/1986 | Chea, Jr. | 379/324 |
| 4,612,417 | 9/1986 | Toumani | 379/413 |
| 4,677,669 | 6/1987 | Kawami et al. | 379/13 |
| 4,736,415 | 4/1988 | McNeill et al. | 379/413 |
| 4,737,981 | 4/1988 | Hoberman et al. | 379/112 |
| 4,866,768 | 9/1989 | Sinberg | 379/413 |
| 4,872,199 | 10/1989 | Kawami et al. | 379/413 |
| 4,899,382 | 2/1990 | Gartner | 379/324 X |
| 4,982,422 | 1/1991 | Itoh et al. | 379/324 |
| 5,113,426 | 5/1992 | Kinoshita et al. | 379/324 X |
| 5,335,272 | 8/1994 | Lofmark et al. | 379/413 |
| 5,347,577 | 9/1994 | Takato et al. | 379/413 |
| 5,444,777 | 8/1995 | Condon et al. | 379/413 |
| 5,515,433 | 5/1996 | Chen | 379/413 X |
| 5,528,688 | 6/1996 | Schorr | 379/413 |

*Primary Examiner*—Thomas W. Brown
*Assistant Examiner*—T. Devendra Kumar

[57] ABSTRACT

Resistive circuits are provided at the tip and ring of the battery feed circuit as a method of alleviating the need for bulky DC transformers or complex integrated circuitry. The voltage is monitored through a set of comparators eliminating the expense of maintaining fused resistors. The voltages for voice or data transmission is amplified prior to being transmitted. Received signals are AC coupled, with proper biasing, onto the tip and ring lines. Any AC noise on the tip and ring line is shifted 180 degrees out of phase and re-inserted on the line to cancel the noise. As an enhancement to the battery feed circuit, another voltage comparator is added to check the line for DC current signifying an off hook condition.

13 Claims, 2 Drawing Sheets

5,659,610

BATTERY FEED CIRCUIT

This is a continuation-in-part of patent application 08/314,101, filed Sep. 28, 1994, now U.S. Pat. No. 5,528,688.

BACKGROUND OF THE INVENTION

1. Field of the Invention

This invention relates generally to a battery feed circuit for telecommunications and more particularly to a low cost battery feed using resistors.

2. Description of the Related Art

A battery feed circuit supplies a DC feed circuit to telecommunications equipment through a 2-wire transmission path that also typically conducts a bi-directional voice or data signal. The feed current is balanced, i.e., each transmission wire conducts a current that is equal in magnitude but opposite in direction to the other.

A variety of battery feed circuits have been developed. In general, these circuits can be grouped into one of two classes depending on their battery feed profile, that is the relationship between the DC feed circuit and the voltage across the 2-wire transmission path. The first class of battery feed circuits produces a linear battery feed profile, e.g. U.S. Pat. No. 4,004,109 to F. S. Boxall, having a low common mode impedance to longitudinal signals. The second class of battery, feed circuits, such as those disclosed in publication "A Floating Low-Power Subscriber Line Interface" by L. Freimanis and D. P. Smith, *ISSCC Digest*, 1980, pages 180, 181, provide a non-linear battery feed profile which limits feed current on short 2-wire transmission paths. The noise induced by longitudinal signals is minimized by providing a high common mode impedance through the use of isolation devices, e.g. transformers or opto-isolators. These devices, however, tend to be bulky and expensive. One prior art attempt to deal with this problem is in U.S. Pat. No. 4,476,350 to Aull et al. by the use of hi-directional current sources.

SUMMARY OF THE INVENTION

In accordance with the principles of the present invention, the resistive feed circuitry alleviates the need for bulky DC transformers or expensive, complex integrated circuitry. The resistors are used in conjunction with a set of voltage comparators to monitor for shorts or erroneously crossed voltage signals on the line. The comparator circuitry eliminates the need to use fused resistors, thus, eliminating the expense of having to replace the fuses as well as tracking down the cause of the fault. Once the comparators detect a fault, the line can be opened with a relay device, until the cause of the fault is found, preventing any dataage to the circuitry.

Added features of the present invention is the ability to easily detect when the phone receiver is on-hook or off-hook, and the cancellation of AC noise on the battery. These features in combination with the resistor feed and comparator circuitry form a relatively small, inexpensive means to comprehensively provide a DC current and an AC signal to a telephone line.

BRIEF DESCRIPTION OF THE DRAWINGS

So that one skilled in the art to which the subject invention appertains will better understand how to practice the present invention, preferred embodiments of the apparatus and method will be described in detail hereinbelow with reference to the drawings wherein.

DESCRIPTION OF THE PREFERRED EMBODIMENTS

Figure 1:
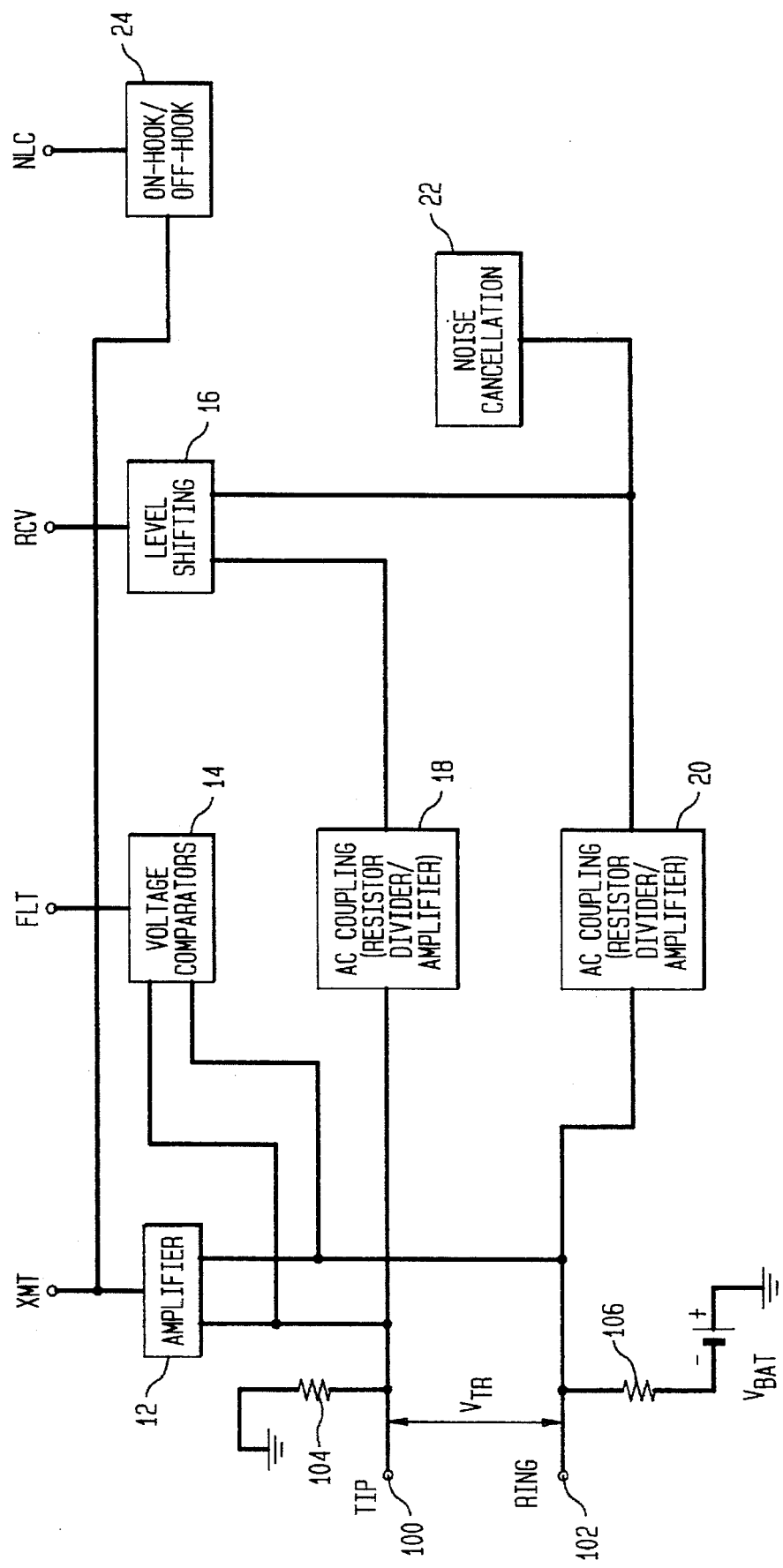
FIG. 1 is a schematic block diagram of a battery feed circuit in accordance with the present invention.

FIG. 1 illustrates, in a simplified manner, the desired operation of the resistive feed architecture shown generally at 10. The input DC voltage to supply the loop DC feed circuit is applied across the DC feed resistors 104 and 106. They provide approximately 600 ohms of AC and DC impedance across the tip 100 and ring 102. Any data or voice signals coming from a phone through the tip 100 and ring 102 will be amplified via amplifier circuitry 12 before being transmitted on the line. At the same time, any signal on the loop is being compared to a reference voltage in the voltage comparator circuitry 14. This circuitry is monitoring for an over-voltage condition on the line. Any data or voice signal that is to be transmitted to the loop goes through level shifting circuit 16 and the resistor divider/amplifier circuits 18 and 20 which block the DC while amplifying and coupling the AC signals being sent to the tip 100 and ring 102 of the telephone line. All the signals on the tip 100 and ring 102 lines are cleared of AC noise through the noise cancellation circuity 22. The on-hook/off-hook circuitry 24 monitors the line to determine whether the user's phone is on or off hook.

Figure 2:
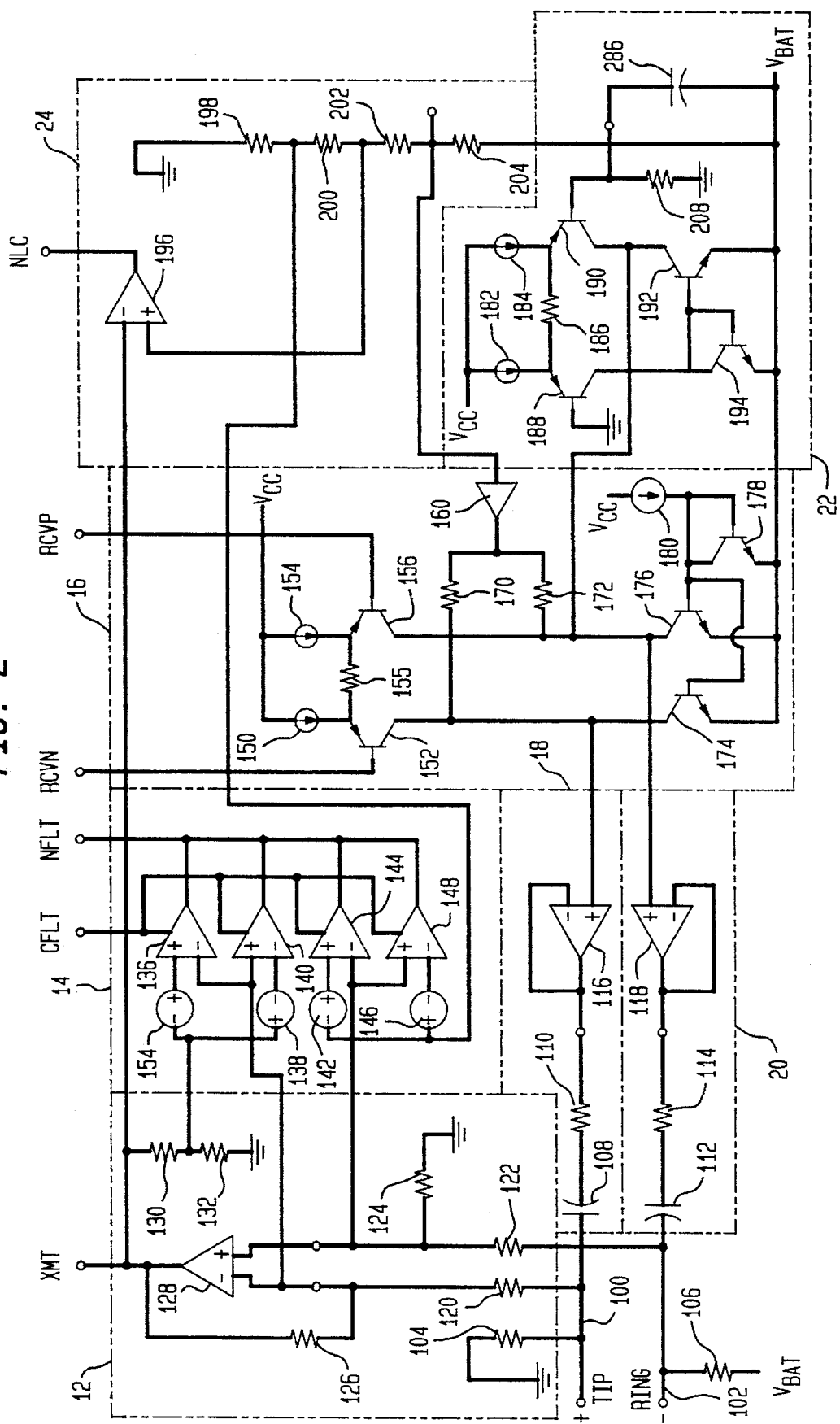
FIG. 2 is a detail schematic diagram of FIG. 1.

Now referring to FIG. 2, the feed resistors 104 and 106 which supply the DC feed current to the loop from the input DC voltage are equal at 325.6 ohms each. This, together with resistors 110 and 114, provides the 600 ohm termination resistance across the tip 100 and ring 102. The differential amplifier 128 provides an output voltage equal to the differential voltage across the tip 100 and ring 102, Vtr, times the value of the ratio of resistors 126 and 120. The value of input resistors 120 and 122 are equal, and the values of ground resistor 124 and feedback resistor 126 are also equal. The voltage output of differential amplifier 128 represents both the differential DC voltage and the AC voltage on the tip 100 and ring 102. This output voltage is coupled to the transmit side of a 4-wire interface, where the DC is blocked thereby allowing only transmission of the AC component. The output voltage of the differential amplifier is also divided by resistors 130 and 132 and fed into a set of 12-volt voltage sources 134 and 138. Two additional voltage sources 142 and 146 are connected to the battery voltage attenuated by resistors 204, 202, 200 and 198. The inputs to the differential amplifier 128 are compared against these sources using four voltage comparators 136, 140, 144 and 148. The comparators indicate a fault if the absolute value of the voltage across either feeding resistor 104 or 106 exceeds 36 volts. The maximum should normally never exceed 24 volts as Vbat normally is 48 volts.

Transistors 152 and 156, along with transistors 174, 176 and 178, form a differential amplifier. Those, in conjunction with current sources 150, 154 and 180 and resistor 155 couple any AC data or voice voltages representing incoming or receive signals to amplifiers 116 and 118. Amplifiers 116 and 118 are of equal gain but opposite phase, providing complementary drive to the tip 100 and ring 102 terminal. Having equal gain is important to provide balanced signals at the tip 100 and ring 102 terminals. Buffer 160 allows for proper biasing through resistors 170 and 172 of the received AC data or voice. Resistor 110 and resistor 114 form resistor dividers going to the tip 100 and ring 102 and capacitors 108 and 112 capacitively couple the signals from amplifiers 116 and 118, blocking the DC voltage. The capacitors 108 and 112 also reduce the quiescent power.

By blocking the DC current from the output of amplifiers 116 and 118, polarized capacitors can be used because the DC bias of amplifiers 116 and 118 is half supply voltage. In a fault condition, the capacitors 108 and 112 could become reverse bias, but resistors 110 and 114 prevent any dataage.

Differential amplifier formed by transistors 188, 190, 192 and 194, with current sources 182 and 184, resistor 208 and capacitor 206, inverses the base of any noise on the battery and re-injects it through amplifier 118 into the ring line to cancel the noise.

Resistors 202 and 204 divide Vbat by two for Vcm. Resistor 200 further divides Vbat by three-sevenths for the reference input to comparator 196, and resistor 198 divides Vbat by three for the reference input to the voltage comparators 144 and 148. Comparator 196 indicates whether the phone is on-hook or off-hook via NLC (Not Loop Closed).

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. A circuit for supplying both direct current and AC signals to a communication terminal via a two-wire communication transmission path having tip and ring lines, comprising:
    a resistive feed circuit including a first resistor coupled between said ring line and a source of potential and a second resistor coupled between said tip line and a point of reference potential, for supplying said direct current to the communication terminal via said transmission path;
    first and second capacitors coupled to said tip and ring lines, respectively;
    third and fourth resistors coupled in series with said first and second capacitors, respectively;
    tip and ring receive amplification means, coupled to said third and fourth resistors, respectively, for providing said AC signals to be transmitted to the communication terminal;
    a transmit amplification circuit for transmitting communication signals originating from the communication terminal;
    fault detection means for detecting faults on said tip and ring lines; and
    an AC coupling network, coupled to said tip and ring receive amplification means, for receiving said AC signals to be transmitted to said communication terminal.

2. The circuit of claim 1 further comprising an AC noise cancellation circuit for attenuating battery noise signals.

3. The circuit of claim 2 wherein said AC noise cancellation is accomplished by 180 degree phase shifting, amplifying and re-injecting said battery noise signals into said transmission path.

4. The circuit of claim 1 further comprising a means of monitoring on hook/off hook of said communication terminal.

5. The circuit of claim 4 wherein said means of monitoring on hook/off hook is a voltage comparator circuit.

6. The circuit of claim 1 wherein said first and second capacitors are each polarized.

7. The circuit of claim 1 wherein said AC coupling network includes AC biasing circuitry.

8. The circuit of claim 1 wherein said fault detection means is a plurality of voltage comparators, each having two input ports with one of said two input ports coupled to one of said tip or ring lines via another resistor and the other port coupled to a source of potential, each comparator providing an output indicative of whether a short or fault voltage exists on the associated tip or ring line.

9. A battery feed circuit for supplying both direct current and AC communication signals to a communication terminal via a two-wire transmission line having tip and ring lines, comprising:
    a resistive feed network comprising a first resistor coupled on one end to said tip line and to a point of reference potential on the other end, a second resistor coupled on one end to said ring line and to a source of potential on the other end;
    a first capacitor coupled between said tip line and a first end of a third resistor;
    a second capacitor coupled between said ring line and a first end of a fourth resistor; and
    a transmit amplification circuit coupled to said tip and ring lines via respective fifth and sixth resistors, said amplification circuit operable to amplify and transmit communication signals originating at said communication terminal;
    wherein second ends of each of said third and fourth resistors are connected to receive said AC communication signals to be provided to said communication terminal.

10. The battery feed circuit according to claim 9, further comprising:
    first and second receive amplifiers having outputs coupled to the second ends of the third and fourth resistors, respectively, said first and second receive amplifiers being of equal gain and opposite phase to provide complementary AC drive to said tip and ring lines; and
    a circuit arrangement for receiving said AC signals intended for said communication terminal and providing said AC signals to said first and second receive amplifiers.

11. The battery feed circuit according to claim 10, further comprising noise cancellation circuitry, coupled to said circuit arrangement and to said source of potential, inverting noise on said battery and re-injecting the inverted noise through said circuit arrangement and said second receive amplifier into said transmission line via said ring line to cancel battery noise present on said transmission line.

12. The battery feed circuit according to claim 9, wherein said capacitors are polarized.

13. The battery feed circuit according to claim 9, wherein said first and second resistors are of a substantially equal resistance and each of said third and fourth resistors are of a resistance substantially higher than said equal resistance.

* * * * *